United States Patent
Hwang et al.

(10) Patent No.: US 7,442,945 B2
(45) Date of Patent: Oct. 28, 2008

(54) FARADAY ASSEMBLY OF ION IMPLANTATION APPARATUS

(75) Inventors: Sun-Ho Hwang, Suwon-si (KR); Sang-Kuk Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 521 days.

(21) Appl. No.: 11/284,833

(22) Filed: Nov. 23, 2005

(65) Prior Publication Data

US 2006/0108536 A1      May 25, 2006

(30) Foreign Application Priority Data

Nov. 25, 2004    (KR)  ............... 10-2004-0097701

(51) Int. Cl.
 *G01K 1/08*  (2006.01)
(52) U.S. Cl. ............. 250/492.21; 250/489; 250/397; 250/396 R
(58) Field of Classification Search ......... 250/492.21, 250/397, 491.1, 489
 See application file for complete search history.

(56) References Cited

U.S. PATENT DOCUMENTS

| | | | | | |
|---|---|---|---|---|---|
| 2,756,133 | A | * | 7/1956 | Butzin | ............ 74/1 R |
| 3,187,601 | A | * | 6/1965 | Glenn | ........... 74/89.39 |
| 4,271,710 | A | * | 6/1981 | Brems | ............. 74/27 |
| 4,492,504 | A | * | 1/1985 | Hainsworth | ........ 414/273 |
| 5,984,353 | A | * | 11/1999 | Rasmussen | ....... 280/766.1 |
| 6,408,745 | B1 | * | 6/2002 | Topolewski et al. | ....... 101/126 |
| 6,437,351 | B1 | * | 8/2002 | Smick et al. | ........ 250/492.21 |
| 6,525,327 | B1 | * | 2/2003 | Mitchell et al. | ....... 250/492.21 |
| 6,852,984 | B2 | * | 2/2005 | Krueger | ............ 250/397 |
| 2002/0109106 | A1 | * | 8/2002 | Berrian et al. | ........ 250/492.21 |
| 2003/0041708 | A1 | * | 3/2003 | Kawatsu et al. | ............ 82/122 |
| 2003/0197133 | A1 | * | 10/2003 | Turner et al. | ........ 250/492.21 |
| 2005/0218336 | A1 | * | 10/2005 | Mori | ........... 250/440.11 |
| 2007/0023701 | A1 | * | 2/2007 | Fishione et al. | ....... 250/492.21 |

FOREIGN PATENT DOCUMENTS

| | | |
|---|---|---|
| JP | 2001-229872 | 8/2001 |
| KR | 2001091553 A * | 10/2001 |
| KR | 2004070634 A * | 8/2004 |
| KR | 1020040070634 A | 8/2004 |
| KR | 1020040076964 A | 9/2004 |

\* cited by examiner

*Primary Examiner*—Jack I. Berman
*Assistant Examiner*—Michael J Logie
(74) *Attorney, Agent, or Firm*—Volentine & Whitt, PLLC

(57) ABSTRACT

A Faraday assembly of an ion implantation apparatus includes a Faraday cup in a vacuum chamber, a driving shaft to which the Faraday cup is connected, a motor for inserting the driving shaft further into and drawing the driving shaft out of the vacuum chamber to cause the Faraday cup to advance and retreat within the chamber, and an auxiliary supplier of power for exerting a force that acts on the driving shaft as the driving shaft is being extracted by the motor from the vacuum chamber. Therefore, the force of suction, due to a pressure difference between interior and exterior of the vacuum chamber, is prevented from overloading the motor as the Faraday cup retreats within the vacuum chamber. As a result, the Faraday cup is positioned precisely and efficiently within the vacuum chamber.

21 Claims, 5 Drawing Sheets

FARADAY ASSEMBLY OF ION IMPLANTATION APPARATUS

BACKGROUND OF THE INVENTION

1. Field of the Invention

The present invention relates to an ion implantation apparatus. More particularly, the present invention relates to a Faraday assembly of an ion implantation apparatus, for moving a Faraday cup within a vacuum chamber of the apparatus.

2. Description of the Related Art

Generally, ion implantation apparatus have been used for a long time in the manufacturing of semiconductor devices. In particular, an ion implantation apparatus forcibly implants ions into a selected region of a wafer made of silicon, for example. The ion implantation apparatus includes a particle accelerator to accelerate the ions as a beam towards the wafer. The ions collide with the silicon atoms of the wafer, thereby gradually losing energy, and stop at a certain depth in the crystal lattice structure of the silicon.

The ion implantation apparatus also includes a Faraday cup. The Faraday cup functions as a sensor for measuring the current, energy, and shape of the ion beam as well as the absorption of ion beam energy at the end of the ion beam. The Faraday cup is typically located in front of a target (the wafer) in a vacuum chamber sometimes referred to as the "target chamber". The location of the Faraday cup in the vacuum chamber can be adjusted according to the region of the target selected for ion implantation. The apparatus for changing the location of the Faraday cup is referred to as a Faraday assembly. The Faraday assembly thus includes a Faraday cup located in a vacuum chamber and power means for moving the Faraday cup in the vacuum chamber in the direction of propagation of the ion beam.

The power means includes a reversible motor, and a ball screw connected to the motor for converting the rotary output of the motor into rectilinear motion. Accordingly, the ball screw can be rotated in forward and reverse directions according to the rotary direction of the output of the motor, so that the Faraday cup can be moved rectilinearly back and forth within the vacuum chamber.

The interior of the vacuum chamber is maintained at a low vacuum pressure of about $10^{-3}$ torr to minimize contamination of the wafer during the ion implantation process. On the contrary, the environment outside the vacuum chamber is at atmospheric pressure. Accordingly, it is relatively easy to advance the Faraday cup within the vacuum chamber. However, a relatively large load is applied to the power means by the vacuum in the vacuum chamber when the Faraday cup is retracted within the vacuum chamber. In this case, the motor is overloaded and draws excessive current, whereupon the Faraday cup is positioned at an incorrect location within the vacuum chamber.

SUMMARY OF THE INVENTION

An object of the present invention is to solve the aforementioned problems of the prior art.

More specifically, an object of the present invention is to provide a Faraday assembly of an ion implantation apparatus that can precisely and reliably position a Faraday cup within a vacuum chamber of the apparatus.

Another object of the present invention is to provide a Faraday assembly of an ion implantation apparatus having an assist for the motor of the assembly so that the motor is not overloaded during an operation of the assembly in which a component of the assembly is being drawn out of a vacuum chamber by the motor.

According to one aspect of the present invention, there is provided a Faraday assembly of an ion implantation apparatus comprising: a Faraday cup located in a vacuum chamber, a driving shaft connected to the Faraday cup and extending outwardly from the vacuum chamber, main power means for moving the driving shaft further into and further out of the vacuum chamber to cause the Faraday cup to advance and retreat within the vacuum chamber, and auxiliary power means to exert an independent force that acts on the driving shaft as the driving shaft is being drawn out of the vacuum chamber by the main power means.

The main power means comprises a motor, such as a reversible motor having a rotary output or a cylinder having a reciprocating piston. The main power means may also include a power transmission mechanism connecting the motor to the driving shaft so as to transmit the power output by the motor to the driving shaft. The power transmission mechanism preferably comprises a ball screw. In the case of the motor being of the type that has a rotary output, the power transmission mechanism also preferably includes a belt and pulley system or the like connecting an output shaft of the motor to the ball screw.

According to yet another aspect of the present invention, there is provided a Faraday assembly of an ion implantation apparatus comprising: a Faraday cup located in a vacuum chamber, a driving shaft connected to the Faraday cup and extending outwardly from the vacuum chamber, a motor operatively connected to the driving shaft so as to move the driving shaft in a first direction in which the driving shaft is extended further into the vacuum chamber and a second direction in which the driving shaft is drawn out of the vacuum chamber, and auxiliary power means for exerting a force acting on the driving shaft in the second direction when the driving shaft is moved by the motor in said second direction.

Preferably, the auxiliary power means comprises a spring.

According to another aspect of the present invention, there is provide a Faraday assembly of an ion implantation apparatus comprising: a Faraday cup located in a vacuum chamber, a driving shaft connected to the Faraday cup and extending outwardly from the vacuum chamber, a motor, a ball screw having a ball nut and a lead screw and driven by the motor, a carrier constituted by the ball nut of the ball screw and to which the driving shaft is fixed such that the driving shaft is moved as the ball nut of the ball screw translates along the lead screw, and a spring supported in the assembly so as to exert a biasing force on the carrier. The carrier may also include a support plate protruding from the ball nut and to which the driving shaft is fixed. The driving shaft can be moved via the carrier in both a first direction in which the driving shaft is extended further into the vacuum chamber and a second direction in which the driving shaft is drawn out of the vacuum chamber so as to reposition the Faraday cup within the vacuum chamber. The biasing force exerted by the spring acts in the second direction as the driving shaft is moved via the carrier in the second direction.

A support shaft may be disposed outside of the vacuum chamber and extend through the support plate parallel to the driving shaft. In this case, the spring is disposed around the support shaft as interposed between the vacuum chamber and the support plate.

Alternatively, the spring may be disposed around the driving shaft as interposed between the vacuum chamber and the support plate.

As still another alternative, the spring may be disposed around the lead screw as interposed between the ball nut and the vacuum chamber.

BRIEF DESCRIPTION OF THE DRAWINGS

The above and other features and advantages of the present invention will become more apparent from the following detailed description of the preferred embodiments thereof made with reference to the attached drawings in which.

DETAILED DESCRIPTION OF THE PREFERRED EMBODIMENTS

Embodiments of a Faraday assembly of an ion implantation apparatus according to the present invention will be described in detail hereinafter with reference to the attached drawings.

Figure 1:
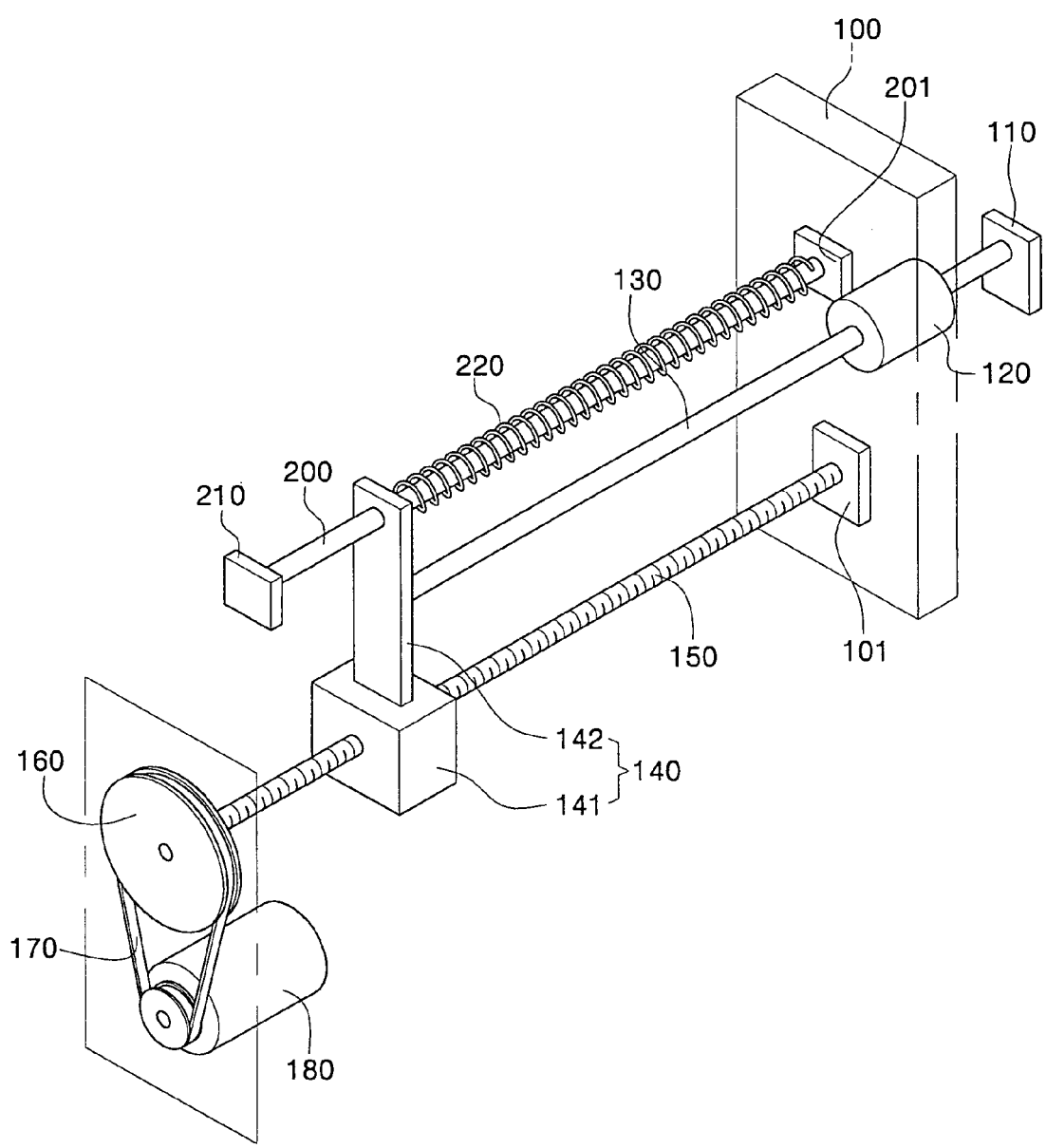
FIG. 1 is a perspective view of a Faraday assembly of an ion implantation apparatus according to the present invention.
Figure 2:
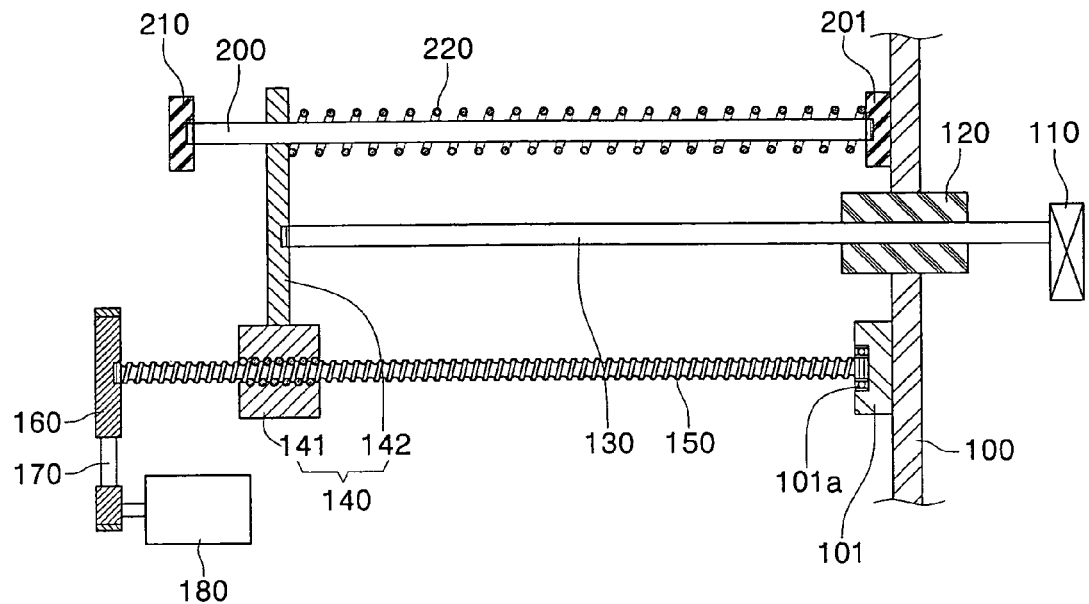
FIG. 2 is a side view of the Faraday assembly of the ion implantation apparatus according to the present invention, and shows a state in which the Faraday cup of the assembly is being retracted within a vacuum chamber.
Figure 3:
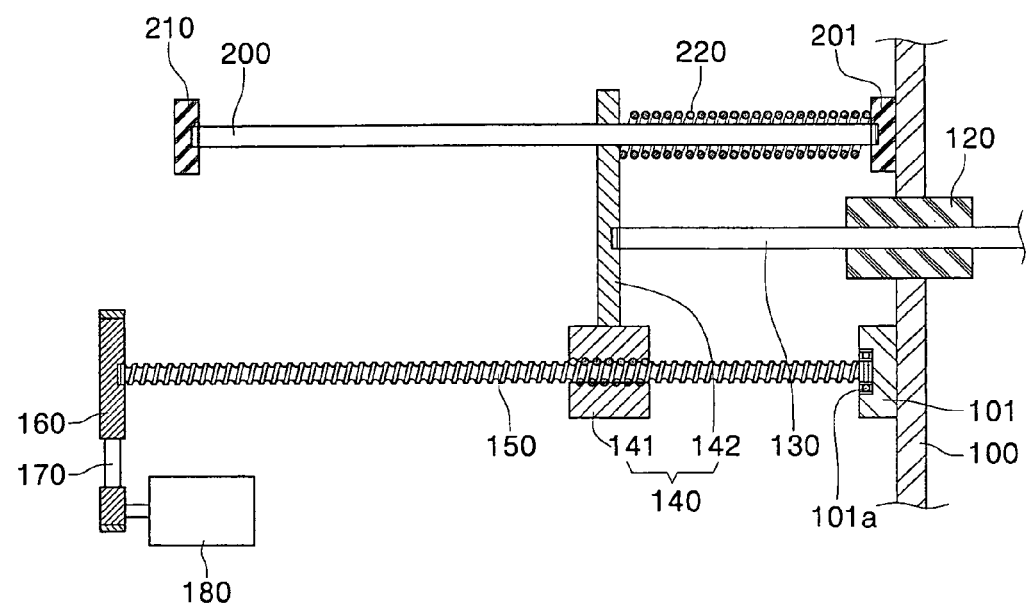
FIG. 3 is a side view of the Faraday assembly of the ion implantation apparatus according to the present invention, and shows a state in which the Faraday cup of the assembly is being advanced within the vacuum chamber.

Referring to FIGS. 1-3, a first embodiment of the Faraday assembly of the ion implantation apparatus according to the present invention includes: a Faraday cup 110 located in a vacuum chamber 100 which is maintained at a low vacuum pressure of about $10^{-3}$ torr; and a driving shaft 130 extending into the vacuum chamber 100 through a wall thereof. One end of the driving shaft 130 is connected to the Faraday cup 110 within vacuum chamber 100 and the other end of the driving shaft 130 is disposed outside the vacuum chamber 100.

Also, the wall of the vacuum chamber 100 is provided with an annular seal 120 for preventing loss of the vacuum pressure within the vacuum chamber 100 and for preventing external air from entering the vacuum chamber 100. The driving shaft 130 is centered in the seal 120. The seal 120 may be cylindrical or may be a gasket fitted to the outer surface of the driving shaft 130.

The Faraday assembly also includes a ball screw whose lead screw 150 extends parallel to and beneath the driving shaft 130 outside the vacuum chamber 100. One end of the lead screw 150 is rotatably supported by a bearing 101a. The bearing 101a is mounted to a pedestal 101 provided on the outside of the wall of the vacuum chamber 100.

In addition, the Faraday assembly comprises a carrier 140 disposed outside the vacuum chamber 100. The carrier 140 includes a conveying block 141 and a support plate 142 that protrudes from the top of the conveying block 141. The conveying block 141 comprises the ball nut of the ball screw, i.e., a nut whose inner threads are engaged with those of the lead screw 150 through a series of balls. The support plate 142 is connected to the end of the driving shaft 130 disposed outside the vacuum chamber 100. The driving shaft 130 and the support plate 142 may be connected by fixing the end of the driving shaft 130 directly to the support plate 142 or by mounting a bracket to the support plate 142 and fixing the end of the driving shaft 130 to the bracket.

Accordingly, as the lead screw 150 is rotated, the conveying block 141 moves along the lead screw 150. As a result, the driving shaft 130 is moved rectilinearly by the support plate 142 in the direction of movement of the conveying block 141.

Furthermore, the Faraday assembly includes a motor, and a power transmission mechanism comprising a belt and pulley system for transmitting the power of the motor to the ball screw. More specifically, the motor may be a reversible motor 180 having a rotary output shaft. The belt and pulley system comprises a power delivering pulley 160 fixed to the outermost end of the lead screw 150, and a power delivering belt 170 wrapped around the power delivering pulley 160 and the output end (pulley on the output shaft) of the motor 180 to transmit the power of the motor 180 to the ball screw. Alternatively, the motor of the Faraday assembly may be a cylinder having a reciprocal piston, and the power transmission mechanism may be a rack and pinion.

Figure 4:
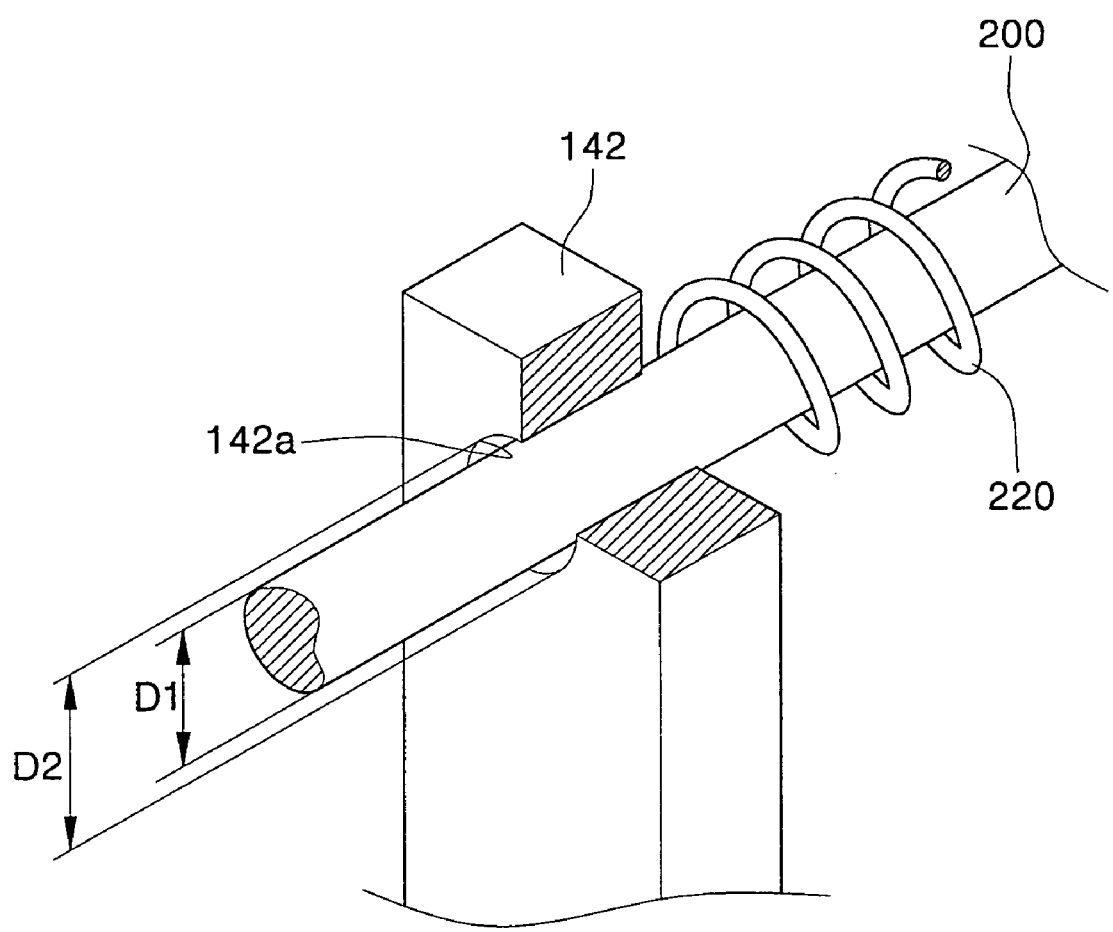
FIG. 4 is an enlarged view of a support plate of the Faraday assembly of the ion implantation apparatus according to the present invention.

Still further, the Faraday assembly has a support shaft 200 extending parallel to and above the driving shaft 130 outside the vacuum chamber 100. One end of the support shaft 200 is fixed to a pedestal 201 provided on the outside of the wall of the vacuum chamber 100. The other end of the support shaft 200 is fixed to another pedestal 210 such that the support shaft 200 extends through a hole 142a in the upper portion of the support plate 142, as shown best in FIG. 4. The inner diameter $D_2$ of the hole 142a is larger than the outer diameter $D_1$ of the support shaft 200. The support shaft 200 is supported by the pedestals 201, 210 so that a predetermined spacing is maintained between the support shaft 200 and the support plate 142. Accordingly, the support plate 142 can be slid freely relative to the support shaft 200.

Therefore, the movement of the support plate 142 does not produce friction with support shaft 200 nor will the support plate 142 bind with the support shaft 200, which friction or binding could otherwise overload the motor 180. In this respect, a separate lubricating member, such as a bearing or bushing, may be provided within the hole 142a to support the support shaft 200 in a manner that essentially prevents friction as the support plate 142 is moved along the support shaft 200.

The Faraday assembly also includes an auxiliary power means for urging the driving shaft 130 in the direction which retracts the Farady cup 100 within the vacuum chamber 100. In the present embodiment, the auxiliary power means is a coil (helical) spring 220. The coil spring 22 extends around the support shaft 200. One end of the spring 220 butts up against the pedestal 201, and the other end thereof butts up against the support plate 142. Preferably, the maximum restoring force of the spring 220 (force exerted by the spring upon its maximum contraction) is smaller than the difference in pressure between interior and exterior of the vacuum chamber 100.

Now, the operation of the above-described Faraday assembly of the present invention will be described in more detail.

During an ion implantation process, a target within the vacuum chamber 100 is scanned with an ion beam. The Faraday cup 110 of the Faraday assembly is moved in the direction of the scan in the vacuum chamber 100 to sense characteristics of the ion beam in the vacuum chamber 100. To this end, the driving shaft 130 adjusts the location of the Faraday cup 110.

For example, the motor 180 is rotated in one direction, e.g., a forward direction. As a result, the rotary power is delivered to the lead screw 150 through the power delivering belt 170 and the power delivering pulley 160. Thus, the lead screw 150 begins to rotate, whereby the driving shaft 130 advances into the vacuum chamber 100. That is, the conveying block 141 of the carrier 140 advances toward the vacuum chamber 100 along the lead screw 150. Accordingly, the driving shaft 130 is extended into the vacuum chamber 100 by the support plate 142 of the carrier 140. At this time, the interior of the vacuum chamber 100 is in a high vacuum state, and the environment outside the vacuum chamber 100 is at atmospheric pressure. Accordingly, a relatively small load is exerted on the motor 180. Also, at this time, the spring 220 is contracted.

Therefore, some load is applied to the motor 180 by the restoring force exerted by the spring 220 on the motor via the support plate 142, ball screw and power transmission mechanism. However, this load is mostly offset by the suction created due to the pressure difference between the interior and exterior of the vacuum chamber 100. Accordingly, the motor 180 is not overloaded even though the spring 220 is contracted.

On the other hand, the motor 180 is rotated rotates in the opposite direction, e.g. in reverse, when the driving shaft 130 is to be drawn from the vacuum chamber. In this case, as well, power is delivered to the ball screw through the power delivering belt 170 and the power delivering pulley 160, and the lead screw 150 rotates in the direction opposite to the direction used to advance the driving shaft 130 within the vacuum chamber 100.

Accordingly, the carrier 140 retreats from the vacuum chamber along the lead screw 150. At this time, suction created by the pressure difference between the interior and exterior of the vacuum chamber 100 is exerted on the driving shaft 130 and the Faraday cup 110 connected to the driving shaft 130. Conventionally, the motor 180 would experience the force of the suction as a load.

However, in the present invention, the force of the suction is offset by the restoring force of the spring 220. That is, the spring 220 functions as an auxiliary power means to reduce the load exerted on the motor 180 while the driving shaft is being drawn out of the vacuum chamber 100. Accordingly, the Faraday cup 110 can be positioned reliably for a long time.

Figure 5:
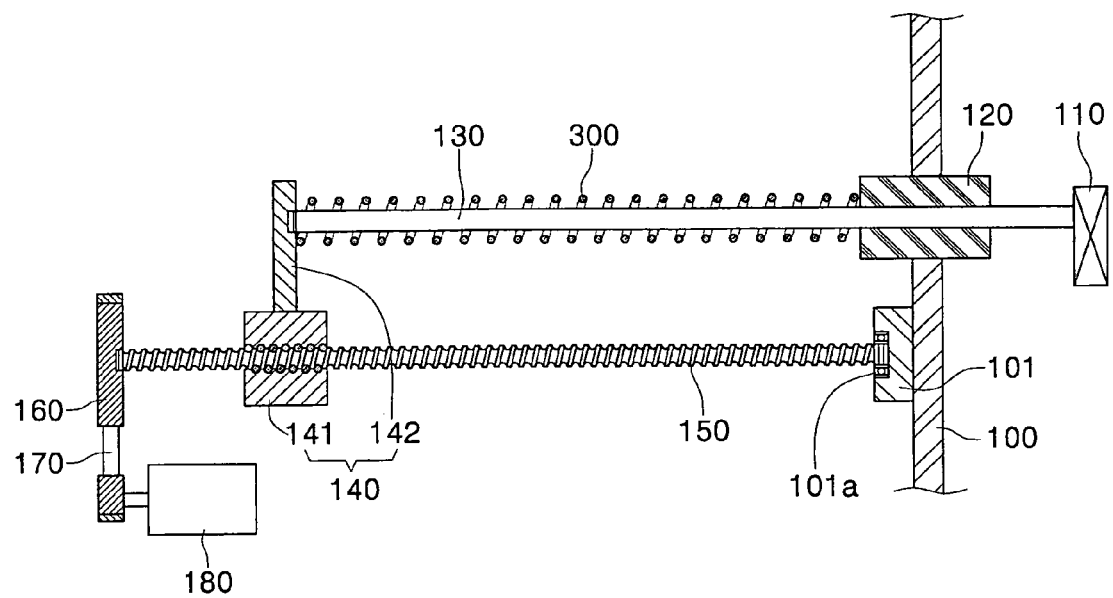
FIG. 5 is a side view of another embodiment of the Faraday assembly of the ion implantation apparatus according to the present invention.

FIG. 5 shows another embodiment of according to the present invention. In this embodiment, a spring 300 is disposed around the driving shaft 130. One end of the spring 300 is supported by the sealing member 120 and the other end thereof is supported by the support plate 142 of the carrier 140.

Figure 6:
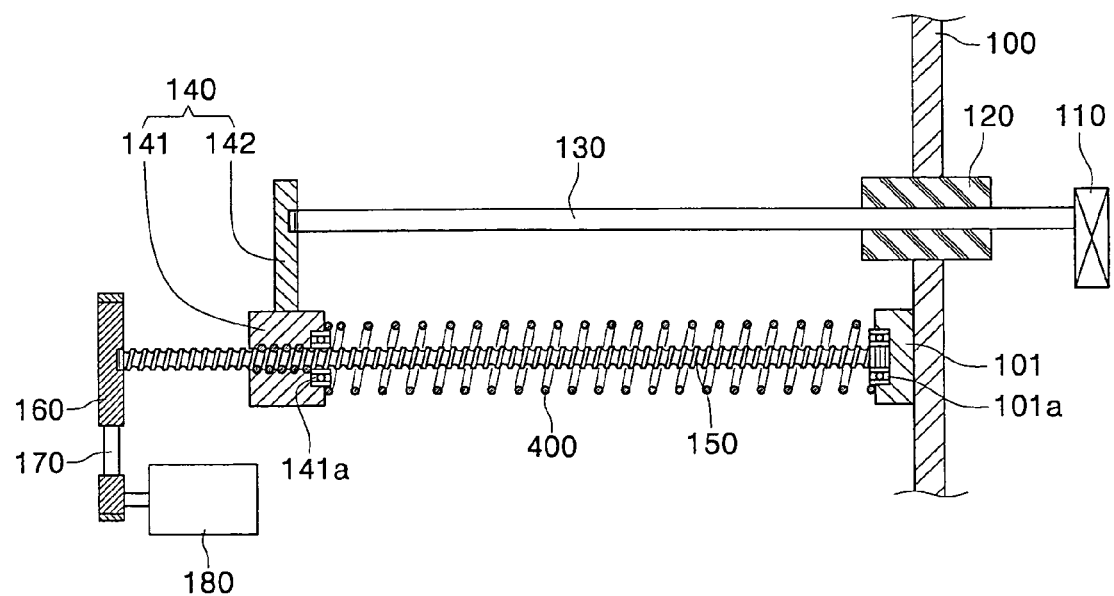
FIG. 6 is a side view of yet another embodiment of the Faraday assembly of the ion implantation apparatus according to the present invention.
Figure 7:
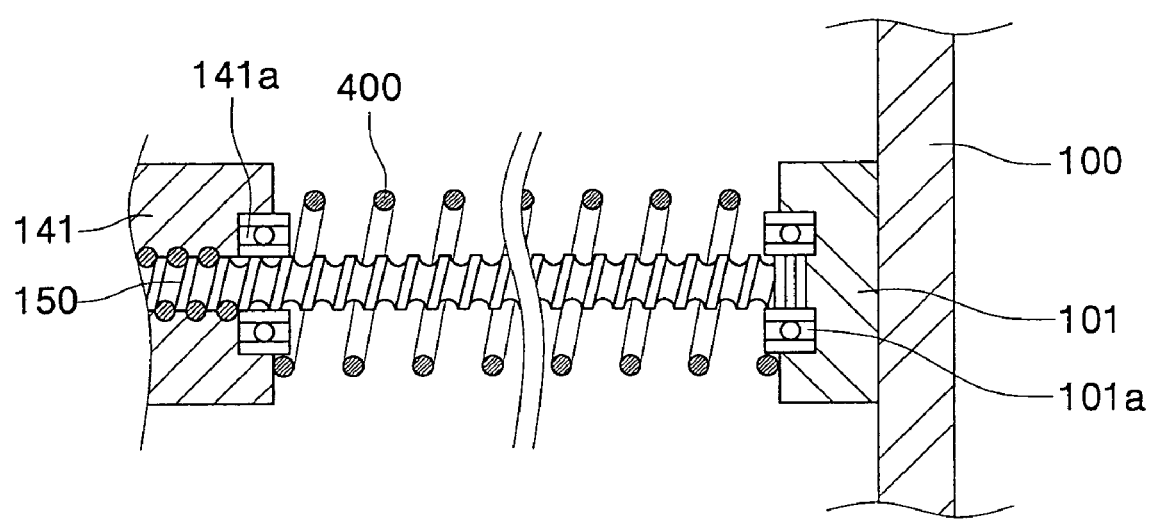
FIG. 7 is an enlarged view of a portion of the embodiment of the Faraday assembly shown in FIG. 6.

According to another embodiment shown in FIG. 6, a spring 400 is disposed around the ball screw 150. One end of the spring 400 is supported by the pedestal 101, and the other end thereof is supported by the conveying block 141 of the carrier 140.

In this embodiment, bearings 101a and 141a prevent the spring 400 from rubbing against the ball screw 150 and thereby damaging or impeding the rotation of the ball screw 150. The bearings 101a and 141a protrude from opposing ends of the pedestal 101 and the conveying block 141, respectively. The ends of the spring 400 are supported by the outer races of the bearings 101a and 141a.

As mentioned above, according to the Faraday assembly of the ion implantation apparatus of the present invention, the force of the suction due to the pressure difference between interior and exterior of the vacuum chamber is prevented from being applied to the motor as the Faraday cup is drawn in a direction towards the outside of the vacuum chamber. Accordingly, the operation, stability and efficiency of the Faraday assembly are improved so that the efficiency of the ion implantation process is enhanced.

Finally, although the present invention has been described in detail above with respect to the preferred embodiments thereof, the present invention is not so limited. For example, springs other than a helical spring can be used as the auxiliary power means. Alternatively, a buffer piston may be employed as the auxiliary power means. Also, various alternatives to the disclosed main power means, power transmission mechanisms, auxiliary power means, and relative dispositions of these components will be readily apparent to those of ordinary skill in the art. Accordingly, such modifications of and changes to the disclosed embodiments are seen to be within the true spirit and scope of the present invention as defined by the appended claims.

What is claimed is:

1. A Faraday assembly of an ion implantation apparatus comprising:
   a Faraday cup disposed in a vacuum chamber of the apparatus;
   a driving shaft extending outwardly from the vacuum chamber, the Faraday cup being connected to the driving shaft in the vacuum chamber;
   main power means disposed outside the vacuum chamber for exerting forces on the driving shaft that move the driving shaft in a first direction in which the driving shaft is extended further into the vacuum chamber and a second direction in which the driving shaft is drawn out of the vacuum chamber, whereby the Faraday cup can be advanced or retreated in the vacuum chamber; and
   auxiliary power means for exerting a force, independently of the force exerted by the main power means, that acts on the driving shaft in said second direction as the driving shaft is being moved by the main power means in said second direction.

2. The Faraday assembly according to claim 1, wherein the main power means comprises a motor and a power transmission mechanism that transmits power generated by the motor to the drive shaft.

3. The Faraday assembly according to claim 2, wherein the power transmission mechanism includes a ball screw comprising a ball nut connected to the driving shaft outside the vacuum chamber, and a lead screw extending through the ball nut and mating therewith such that rotation of the lead screw relative to the ball nut causes the ball nut to translate along the lead screw, the motor being operatively connected to the ball screw so as to rotate the lead screw relative to the ball nut.

4. The Faraday assembly according to claim 3, wherein the auxiliary power means is a spring.

5. The Faraday assembly according to claim 4, wherein the spring is disposed around the ball screw as interposed between the ball nut and the vacuum chamber.

6. The Faraday assembly according to claim 3, wherein the power transmission mechanism further includes a pulley mounted to an end of the lead screw, and a belt connecting the pulley to the motor.

7. The Faraday assembly according to claim 3, wherein the power transmission mechanism further comprises a support plate that extends from the ball nut and is connected to the driving shaft outside the vacuum chamber.

8. The Faraday assembly according to claim 7, wherein the auxiliary power means is a spring extending around driving shaft as interposed between the support plate and the vacuum chamber.

9. The Faraday assembly according to claim 7, wherein the auxiliary power means comprises a support shaft disposed outside of the vacuum chamber and extending through the support plate parallel to the driving shaft, and a spring disposed around the support shaft as interposed between the vacuum chamber and the support plate.

10. The Faraday assembly according to claim 9, and further comprising a stop plate supporting an end of the support shaft remote from the vacuum chamber.

11. The Faraday assembly according to claim 7, wherein the auxiliary power means is a spring disposed around the driving shaft as interposed between the support plate and the vacuum chamber.

12. A Faraday assembly of an ion implantation apparatus comprising:
a Faraday cup disposed in a vacuum chamber of the apparatus;
a driving shaft extending outwardly from the vacuum chamber, the Faraday cup being connected to the driving shaft in the vacuum chamber;
a ball screw including a ball nut, and a lead screw extending through the ball nut and mating therewith such that rotation of the lead screw relative to the ball nut causes the ball nut to translate along the lead screw;
a carrier constituted by the ball nut of the ball screw, the driving shaft being fixed to the carrier so as to move therewith when the ball nut translates along the lead screw;
a motor operatively connected to the ball screw so as to rotate the lead screw relative to the ball nut, whereby the driving shaft can be moved via the carrier in a first direction in which the driving shaft is extended further into the vacuum chamber and a second direction in which the driving shaft is drawn out of the vacuum chamber so as to reposition the Faraday cup within the vacuum chamber; and
a spring supported in the assembly so as to exert a biasing force on the carrier that acts in said second direction as the driving shaft is moved via the carrier in said second direction.

13. The Faraday assembly according to claim 12, and further comprising pulley mounted to an end of the lead screw, and a belt connecting the pulley to the motor.

14. The Faraday assembly according to claim 12, wherein the carrier is also constituted by a support plate that extends from the ball nut, the driving shaft being connected to the support plate.

15. The Faraday assembly according to claim 14, and further comprising a support shaft disposed outside of the vacuum chamber and extending through the support plate parallel to the driving shaft, and wherein the spring is disposed around the support shaft as interposed between the vacuum chamber and the support plate.

16. The Faraday assembly according to claim 15, and further comprising a stop plate supporting an end of the support shaft remote from the vacuum chamber.

17. The Faraday assembly according to claim 14, wherein the spring is disposed around the driving shaft as interposed between the vacuum chamber and the support plate.

18. The Faraday assembly according to claim 12, wherein the spring is disposed around the ball screw as interposed between the vacuum chamber and the ball nut.

19. The Faraday assembly according to claim 18, wherein the carrier is also constituted by a support plate that extends from the ball nut, the driving shaft being connected to the support plate.

20. A Faraday assembly of an ion implantation apparatus comprising:
a Faraday cup disposed in a vacuum chamber of the apparatus;
a driving shaft extending outwardly from the vacuum chamber, the Faraday cup being connected to the driving shaft in the vacuum chamber;
a motor operatively connected to the driving shaft so as to move the driving shaft in a first direction in which the driving shaft is extended further into the vacuum chamber and a second direction in which the driving shaft is drawn out of the vacuum chamber, whereby the Faraday cup can be advanced or retreated in the vacuum chamber; and
auxiliary power means for exerting a force, acting on the driving shaft in said second direction, when the driving shaft is moved by the motor in said second direction.

21. The Faraday assembly according to claim 20, wherein the auxiliary power means comprises a spring.

* * * * *